US011961345B2

(12) United States Patent
Fukuda et al.

(10) Patent No.: US 11,961,345 B2
(45) Date of Patent: Apr. 16, 2024

(54) WIRELESS COMMUNICATION SYSTEM

(71) Applicant: PANASONIC INTELLECTUAL PROPERTY MANAGEMENT CO., LTD., Osaka (JP)

(72) Inventors: Michihiko Fukuda, Kanagawa (JP);
Masami Takigawa, Kanagawa (JP);
Hitoshi Namba, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 392 days.

(21) Appl. No.: 17/485,218

(22) Filed: Sep. 24, 2021

(65) Prior Publication Data

US 2022/0012964 A1 Jan. 13, 2022

Related U.S. Application Data

(63) Continuation of application No. PCT/JP2020/005533, filed on Feb. 13, 2020.

(30) Foreign Application Priority Data

Mar. 29, 2019 (JP) ................. 2019-068798

(51) Int. Cl.
*G07C 9/00* (2020.01)
*H04B 17/327* (2015.01)
*H04W 4/40* (2018.01)

(52) U.S. Cl.
CPC ....... *G07C 9/00309* (2013.01); *H04B 17/327* (2015.01); *H04W 4/40* (2018.02);
(Continued)

(58) Field of Classification Search
None
See application file for complete search history.

(56) References Cited

U.S. PATENT DOCUMENTS 10,171,165 B2 * 1/2019 Aoyama .............. H04B 10/116
2007/0030136 A1    2/2007 Teshima et al.
(Continued)

FOREIGN PATENT DOCUMENTS

DE    102006033883 A1    2/2007
DE    102016117060 A1    3/2017
(Continued)

OTHER PUBLICATIONS

International Search Report, dated Apr. 7, 2020, for International Application No. PCT/JP2020/005533, 5 pages. (with English translation).

(Continued)

*Primary Examiner* — Carlos Garcia
(74) *Attorney, Agent, or Firm* — Seed IP Law Group LLP

(57) ABSTRACT

A vehicle (20) transmits an LF command (Wa), an electronic key (30) transmits, to the vehicle (20), an RF command responsive to the LF command (Wa), the vehicle (20) transmits, to the electronic key (30), an LF command (Wb) having a longer packet length than the LF command (Wa), and the electronic key (30) transmits, to the vehicle (20), an RF command responsive to the LF command (Wb) on the basis of the electric field strength of an LF-RSSI burst of a part of the LF command (Wb), thus turning on an interior light (501).

20 Claims, 9 Drawing Sheets

(52) U.S. Cl.
   CPC ............. *G07C 2009/00357* (2013.01); *G07C 2009/00373* (2013.01); *G07C 2009/00507* (2013.01)

(56) References Cited

U.S. PATENT DOCUMENTS

| | | |
|---|---|---|
| 2017/0076524 A1 | 3/2017 | Yoshihara |
| 2017/0206417 A1* | 7/2017 | Aoyama ............... H04L 1/0061 |
| 2017/0263066 A1 | 9/2017 | Kang et al. |
| 2017/0274870 A1 | 9/2017 | Nishiyama et al. |
| 2018/0138977 A1* | 5/2018 | Aoyama ............. H04L 12/4625 |
| 2019/0316387 A1 | 10/2019 | Egawa et al. |

FOREIGN PATENT DOCUMENTS

| | | |
|---|---|---|
| DE | 102017106003 A1 | 9/2017 |
| DE | 102017200040 A1 | 9/2017 |
| JP | H05-231057 A | 9/1993 |
| JP | 2012-046918 A | 3/2012 |
| JP | 2015-059398 A | 3/2015 |
| JP | 2017-128884 A | 7/2017 |
| JP | 2018-061157 A | 4/2018 |

OTHER PUBLICATIONS

Written Opinion of the International Searching Authority, dated Apr. 7, 2020, for International Application No. PCT/JP2020/005533, 7 pages. (with English translation).

German Office Action dated Jan. 26, 2024, for the corresponding German Patent Application No. 112020001669.2, 8 pages. (With English Translation).

\* cited by examiner

FORMAT OF LF COMMAND Wa

| WAKE PATTERN | COMMAND TYPE (Wa) | LF ANTENNA TYPE | GROUP ID |

FIG. 3A

FORMAT OF LF COMMAND Wb

| WAKE PATTERN | COMMAND TYPE (Wb) | LF ANTENNA TYPE | GROUP ID | LF-RSSI BURST |

FORMAT OF RF COMMAND WITH RESPECT TO LF COMMAND Wa

| SYNCHRONIZATION PATTERN | FUNCTION CODE | ID CODE | NO-BURST COMMAND | FOB INFORMATION |

FIG. 4B

FORMAT OF RF COMMAND WITH RESPECT TO LF COMMAND Wb

| SYNCHRONIZATION PATTERN | FUNCTION CODE | ID CODE | BURST COMMAND | FOB INFORMATION |

FIG. 5

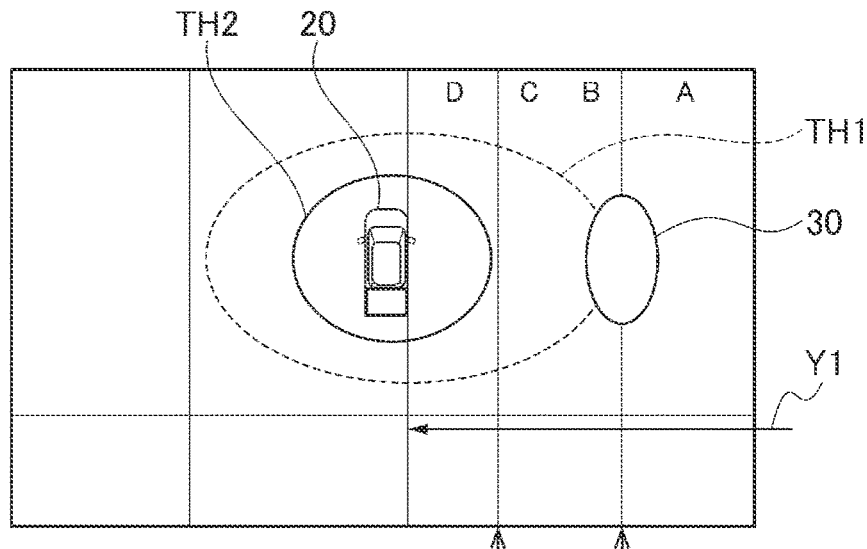

| | | D | C | B | A |
|---|---|---|---|---|---|
| PATTERN P1 | ELECTRONIC KEY NORMALLY APPROACHES VEHICLE FROM REGION A. LIGHT IS TURNED ON AND WELCOME FLOW IS ENDED. | LF RECEPTION : ONCE (WITH BURST) RF TRANSMISSION: ONCE | | LF RECEPTION : ONCE (WITHOUT BURST) RF TRANSMISSION: ONCE | |
| PATTERN P2 | ELECTRONIC KEY CONTINUES TO REMAIN IN REGION C. (1): AFTER 30 SECONDS ELAPSE, STATE DEVIATES FROM FLOW (LOOP) FOR TURNING ON LIGHT AND TRANSMISSIONS TO CONFIRMATION OF LEAVING FROM VEHICLE (2). (2): SINCE ELECTRONIC KEY CONTINUES TO REMAIN EVEN AFTER ELAPSE OF 5 MINUTES, WELCOME FLOW IS ENDED. | | LF RECEPTION: XX TIMES (WITH BURST) WITHOUT RF TRANSMISSION | LF RECEPTION : ONCE (WITHOUT BURST) RF TRANSMISSION: ONCE | |
| PATTERN P3 | ELECTRONIC KEY RETURNS TO REGION A FROM STATE OF (1) OF PATTERN P2. FUNCTION OF TURNING ON ROOM LIGHT IS CONTINUED. | | ex: 1 min | | RETURN |
| PATTERN P4 | ELECTRONIC KEY RETURNS TO REGION A BEFORE ENTERING STATE OF (1) OF PATTERN P2. FUNCTION OF TURNING ON ROOM LIGHT IS CONTINUED. | | ex: 1 sec | | RETURN |
| PATTERN P5 | ELECTRONIC KEY IS CONTINUOUSLY PRESENT IN REGION A. FUNCTION OF TURNING ON ROOM LIGHT IS ENDED. | | | | ex: 7 DAYS |

WIRELESS COMMUNICATION SYSTEM

CROSS-REFERENCE TO RELATED APPLICATIONS

This is a continuation of International Application No. PCT/JP2020/005533 filed on Feb. 13, 2020, and claims priority from Japanese Patent Application No. 2019-068798 filed on Mar. 29, 2019, the entire content of which is incorporated herein by reference.

TECHNICAL FIELD

The present disclosure relates to a wireless communication system including a vehicle and a portable device (for example, an electronic key) capable of performing wireless communication with the vehicle.

BACKGROUND ART

In a vehicle such as an automobile, smart entry that allows a user to enter the vehicle using a portable device is widely used. Some smart entries have a welcome light function that determines that the user approaches the vehicle after leaving the vehicle and turns on a room light (interior light) or the like of the vehicle.

As a system for operating the welcome light function, for example, there is a portable device collation system described in PTL 1. In this portable device collation system, an own vehicle changes a transmission cycle of a polling radio wave from a long transmission cycle to a short transmission cycle by receiving a response radio wave returned from an authorized portable device that has received a polling radio wave from another vehicle, and transmits the polling radio wave in the short transmission cycle. The polling radio wave is used to monitor whether a user who possesses the regular portable device has entered a communication area, and when it is detected that the user has entered the communication area, the welcome light function is operated.

Further, in the above-described vehicle, a vehicle door lock device that automatically locks a door is also widely used. An example of the vehicle door lock device is disclosed in PTL 2. In the vehicle door lock device disclosed in PTL 2, an electronic key includes: a threshold setting unit that stores a first threshold for setting a first region in which an electric field strength of a response request signal is strong, and a second threshold for setting a second region in which an electric field strength is weaker than the electric field strength of the first region around the first region; and a response signal generation unit that outputs, as a response signal, position information including whether the electronic key is located in any one of a first region, a second region, or outside the second region, based on the electric field strength of the response request signal and the first and second thresholds, in which an in-vehicle device includes an in-vehicle control unit that switches a vehicle to an unlocked state when the electronic key stays in the first region for a predetermined time or more, and switches the vehicle to a locked state when the electronic key stays outside the second region for a predetermined time or more, based on a reception of the response signal.

There is a type of electronic key called "FOB".

CITATION LIST

Patent Literature

[PTL 1] JP-A-2018-061157
[PTL 2] JP-A-2017-128884

SUMMARY OF INVENTION

Technical Problem

In the related-art welcome light function of the smart entry, since it is necessary to determine a distance to the user, it is necessary to continuously perform communication, and battery consumption of the vehicle and the portable device is a problem. For example, the related-art welcome light function may perform communication for periodically searching for the portable device after the user leaves the vehicle, first detect that the user approaches about 3 to 4 m, then switch to communication with relatively large power consumption in order to measure an accurate distance from the vehicle, and turn on a room light to end the communication when it is determined that the user approaches about 2 m from the vehicle. However, when the portable device is placed in a communication range of 2 to 3 m, the communication is continued, and thus there is a problem that battery consumption increases in both the vehicle and the portable device.

An object of the present disclosure is to provide a wireless communication system capable of saving power particularly in a vehicle in a welcome light function of a smart entry.

Solution to Problem

A wireless communication system of the present disclosure includes: a vehicle; and a portable device, in which the vehicle includes a light emitting circuit capable of changing illuminance and a first wireless communication circuit capable of performing wireless communication with the portable device, the portable device includes a second wireless communication circuit capable of performing wireless communication with the first wireless communication circuit of the vehicle, at least in a case where the light emitting circuit of the vehicle has a first illuminance, the first wireless communication circuit of the vehicle transmits a first packet, in a case where the second wireless communication circuit receives the first packet, the portable device transmits a first instruction to the vehicle, in a case where the first instruction is received, the first wireless communication circuit of the vehicle transmits a second packet having a packet length longer than that of the first packet, in a case where the second wireless communication circuit receives the second packet, the portable device transmits a second instruction to the vehicle based on an electric field intensity of at least a part of the second packet, and in a case where the second instruction is received, the light emitting circuit of the vehicle has a second illuminance that is brighter than the first illuminance.

According to the present disclosure, the vehicle transmits the first packet having a short packet length that is for detection of the portable device and the second packet having a long packet length that is for detecting that the portable device has approached the vehicle within a predetermined distance and for brightening the illuminance of the light emitting circuit. Since the first packet is transmitted until the portable device is detected at the communication limit, power saving can be achieved. After the vehicle transmits the first packet and detects the portable device at the communication limit, the vehicle transmits the second packet with large power consumption in order to determine a distance to the portable device, but by using the second package with large power consumption, the portable device can be detected with high accuracy, so that it is not necessary to frequently transmit the second packet. Therefore, power saving can also be achieved in the transmission of the second packet.

Actually, it is not known by the present system whether the light emitting circuit is in the first illuminance (off), and after confirming that the portable device has left the vehicle in a state where all the doors are locked, the transmission of the first packet is started.

In the wireless communication system of the present disclosure, in the above configuration, in the case where the second wireless communication circuit receives the second packet, the portable device transmits the second instruction to the vehicle in a case where an electric field intensity of the at least a part of the second packet is equal to or greater than a predetermined value.

According to the present disclosure, since the portable device transmits the second instruction to the vehicle only when the electric field intensity of the at least a part of the received second packet is equal to or greater than the predetermined value, power saving can be achieved.

In the wireless communication system of the present disclosure, in the above configuration, in the case where the second wireless communication circuit receives the second packet, the portable device does not transmit the second instruction to the vehicle in a case where the electric field intensity of the at least a part of the second packet is less than the predetermined value.

According to the present disclosure, in a case where the electric field intensity of the at least a part of the received second packet is less than the predetermined value, since the portable device does not transmit the second instruction to the vehicle, power saving can be achieved.

In the wireless communication system of the present disclosure, in the above configuration, in the case where the first instruction is received, the first wireless communication circuit of the vehicle repeatedly transmits the second packet at predetermined time intervals.

According to the present disclosure, when the vehicle receives the first instruction from the portable device, since the vehicle repeatedly transmits the second packet at the predetermined time intervals, power saving can be achieved as compared with a case where the second packet is frequently transmitted.

In the wireless communication system of the present disclosure, in the above configuration, the first wireless communication circuit of the vehicle stops the repetitive transmission of the second packet in a case where the second packet is repeatedly transmitted for a time longer than a predetermined time.

According to the present disclosure, even if the vehicle repeatedly transmits the second packet for a time longer than the predetermined time, if the second instruction is not transmitted from the portable device, the vehicle stops the repetitive transmission of the second packet, and thus power saving can be achieved.

In the wireless communication system of the present disclosure, in the above configuration, the first wireless communication circuit of the vehicle stops the repetitive transmission of the second packet and transmits the first packet in the case where the second packet is repeatedly transmitted for the time longer than the predetermined time.

According to the present disclosure, even if the vehicle repeatedly transmits the second packet for the time longer than the predetermined time, if the second instruction is not transmitted from the portable device, the vehicle stops the repetitive transmission of the second packet and switches again to the transmission of the first packet with a short packet length, and thus power saving can be achieved.

In the wireless communication system of the present disclosure, in the present configuration, the vehicle further includes a third wireless communication circuit, the portable device further includes a fourth wireless communication circuit, the first instruction is transmitted from the fourth wireless communication circuit of the portable device to the third wireless communication circuit of the vehicle, and the second instruction is transmitted from the fourth wireless communication circuit of the portable device to the third wireless communication circuit of the vehicle.

According to the present disclosure, an optimum communication mode can be obtained on each of the vehicle side and the portable device side.

In the wireless communication system of the present disclosure, in the present configuration, a wavelength of a radio wave used in communication between the first wireless communication circuit and the second wireless communication circuit is longer than a wavelength of a radio wave used in communication between the third wireless communication circuit and the fourth wireless communication circuit.

According to the present disclosure, a frequency is lowered to weaken straightness on the vehicle side, and a frequency is raised to strengthen the straightness on the portable device side, so that an optimum communication mode can be obtained on each of the vehicle side and the portable device side. That is, constant transmission and reception can be performed from any direction on the vehicle side, and transmission and reception toward the vehicle side can be performed on the portable device side.

In the wireless communication system of the present disclosure, in the present configuration, the first illuminance of the light emitting circuit indicates turning off.

According to the present disclosure, the light emitting circuit (for example, a room light) of the vehicle is in an off state until the portable device transmits the second instruction to the vehicle, and the portable device transmits the second instruction, so that the light emitting circuit can be in an on state.

In the wireless communication system of the present disclosure, in the present configuration, at least a part of the second packet continues for a predetermined time and keeps at predetermined amplitude.

According to the present disclosure, the portable device can reliably acquire a signal strength of the second packet.

A wireless communication system of the present disclosure includes: a wireless communication device capable of being mounted on a vehicle; and a portable device, in which the vehicle includes a light emitting circuit capable of changing illuminance, the wireless communication device includes a first wireless communication circuit capable of performing wireless communication with the portable device, the portable device includes a second wireless communication circuit capable of performing wireless communication with the first wireless communication circuit of the wireless communication device, at least in a case where the light emitting circuit of the vehicle has a first illuminance, the first wireless communication circuit of the wireless communication device transmits a first packet, in a case where the second wireless communication circuit receives the first packet, the portable device transmits a first instruction to the wireless communication device, in a case where the first instruction is received, the first wireless communication circuit of the wireless communication device transmits a second packet having a packet length longer than that of the first packet, in a case where the second wireless communication circuit receives the second packet, the portable device transmits a second instruction to the wireless communication device based on an electric field strength of at least a part of the second packet, and in a case where the second instruction is received, the light emitting circuit of the vehicle has a second illuminance that is brighter than the first illuminance.

According to the present disclosure, the wireless communication device transmits the first packet having a short packet length that is for detection of the portable device and the second packet having a long packet length that is for detecting that the portable device has approached the vehicle within a predetermined distance and for brightening the illuminance of the light emitting circuit. Since the first packet is transmitted until the portable device is detected at the communication limit, power saving can be achieved. After the wireless communication device transmits the first packet and detects the portable device at the communication limit, the wireless communication device transmits the second packet with large power consumption in order to determine a distance to the portable device, but by using the second package with large power consumption, the portable device can be detected with high accuracy, so that it is not necessary to frequently transmit the second packet. Therefore, power saving can also be achieved in the transmission of the second packet.

In the wireless communication system of the present disclosure, in the above configuration, in the case where the second wireless communication circuit receives the second packet, the portable device transmits the second instruction to the wireless communication device in a case where the electric field intensity of the at least a part of the second packet is equal to or greater than a predetermined value.

According to the present disclosure, since the portable device transmits the second instruction to the vehicle only when the electric field intensity of the at least a part of the received second packet is equal to or greater than the predetermined value, power saving can be achieved.

In the wireless communication system of the present disclosure, in the above configuration, in the case where the second wireless communication circuit receives the second packet, the portable device does not transmit the second instruction to the wireless communication device in a case where the electric field intensity of the at least a part of the second packet is less than the predetermined value.

According to the present disclosure, in the case where the electric field intensity of the at least a part of the received second packet is less than the predetermined value, since the portable device does not transmit the second instruction to the vehicle, power saving can be achieved.

In the wireless communication system of the present disclosure, in the above configuration, in the case where the first instruction is received, the first wireless communication circuit of the wireless communication device repeatedly transmits the second packet at predetermined time intervals.

According to the present disclosure, when the vehicle receives the first instruction from the portable device, since the wireless communication device repeatedly transmits the second packet at the predetermined time intervals, power saving can be achieved as compared with the case where the second packet is frequently transmitted.

In the wireless communication system of the present disclosure, in the above configuration, the first wireless communication circuit of the wireless communication device stops the repetitive transmission of the second packet in the case where the second packet is repeatedly transmitted for a time longer than the predetermined time.

According to the present disclosure, even if the wireless communication device repeatedly transmits the second packet for a time longer than the predetermined time, if the second instruction is not transmitted from the portable device, the wireless communication device stops the repetitive transmission of the second packet, and thus power saving can be achieved.

In the wireless communication system of the present disclosure, in the above configuration, the first wireless communication circuit of the wireless communication device stops the repetitive transmission of the second packet and transmits the first packet in the case where the second packet is repeatedly transmitted for the time longer than the predetermined time.

According to the present disclosure, even if the wireless communication device repeatedly transmits the second packet for the time longer than the predetermined time, if the second instruction is not transmitted from the portable device, the wireless communication device stops the repetitive transmission of the second packet and switches again to the transmission of the first packet with a short packet length, and thus power saving can be achieved.

In the wireless communication system of the present disclosure, in the present configuration, the wireless communication device further includes a third wireless communication circuit, the portable device further includes a fourth wireless communication circuit, the first instruction is transmitted from the fourth wireless communication circuit of the portable device to the third wireless communication circuit of the wireless communication device, and the second instruction is transmitted from the fourth wireless communication circuit of the portable device to the third wireless communication circuit of the wireless communication device.

According to the present disclosure, an optimum communication mode can be obtained on each of the wireless communication device side and the portable device side.

In the wireless communication system of the present disclosure, in the present configuration, a wavelength of a radio wave used in communication between the first wireless communication circuit and the second wireless communication circuit is longer than a wavelength of a radio wave used in communication between the third wireless communication circuit and the fourth wireless communication circuit.

According to the present disclosure, a frequency is lowered to weaken straightness on the wireless communication device side, and a frequency is raised to strengthen the straightness on the portable device side, so that an optimum communication mode can be obtained on each of the wireless communication device side and the portable device side. That is, constant transmission and reception can be performed from any direction on the wireless communication device side, and transmission and reception toward the wireless communication device side can be performed on the portable device side.

In the wireless communication system of the present disclosure, in the present configuration, the first illuminance of the light emitting circuit indicates turning off.

According to the present disclosure, the light emitting circuit (for example, a room light) of the vehicle is in an off state until the portable device transmits the second instruction to the wireless communication device, and the portable device transmits the second instruction, so that the light emitting circuit can be in an on state.

In the wireless communication system of the present disclosure, in the present configuration, at least a part of the second packet continues for a predetermined time and keeps at predetermined amplitude.

According to the present disclosure, the portable device can reliably acquire a signal strength of the second packet.

Advantageous Effects of Invention

According to a present disclosure, in the welcome light function of the smart entry, it is possible to save power particularly in the vehicle.

BRIEF DESCRIPTION OF DRAWINGS

FIG. 3A is a diagram illustrating a format of an LF command Wa transmitted from an LF transmission unit of the vehicle of the wireless communication system according to the embodiment.

FIG. 3B is a diagram illustrating a format of an LF command Wb transmitted from an LF transmission unit of the vehicle of the wireless communication system according to the embodiment.

FIG. 4A is a diagram illustrating a format of an RF command transmitted from an RF transmission unit of an electronic key for LF command Wa transmitted from the vehicle of the wireless communication system according to the embodiment.

FIG. 4B is a diagram illustrating a format of an RF command transmitted from an RF transmission unit of an electronic key for LF command Wb transmitted from the vehicle of the wireless communication system according to the embodiment.

FIG. 5 is a diagram illustrating operations of the vehicle and the electronic key when the electronic key approaches the vehicle after a user leaves the vehicle in the wireless communication system according to the embodiment.

DESCRIPTION OF EMBODIMENTS

Hereinafter, an embodiment in which a wireless communication system according to a present disclosure (hereinafter, referred to as "the present embodiment") is specifically disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Hereinafter, a preferred present embodiment for carrying out the present disclosure will be described in detail with reference to the drawings.

Figure 1:
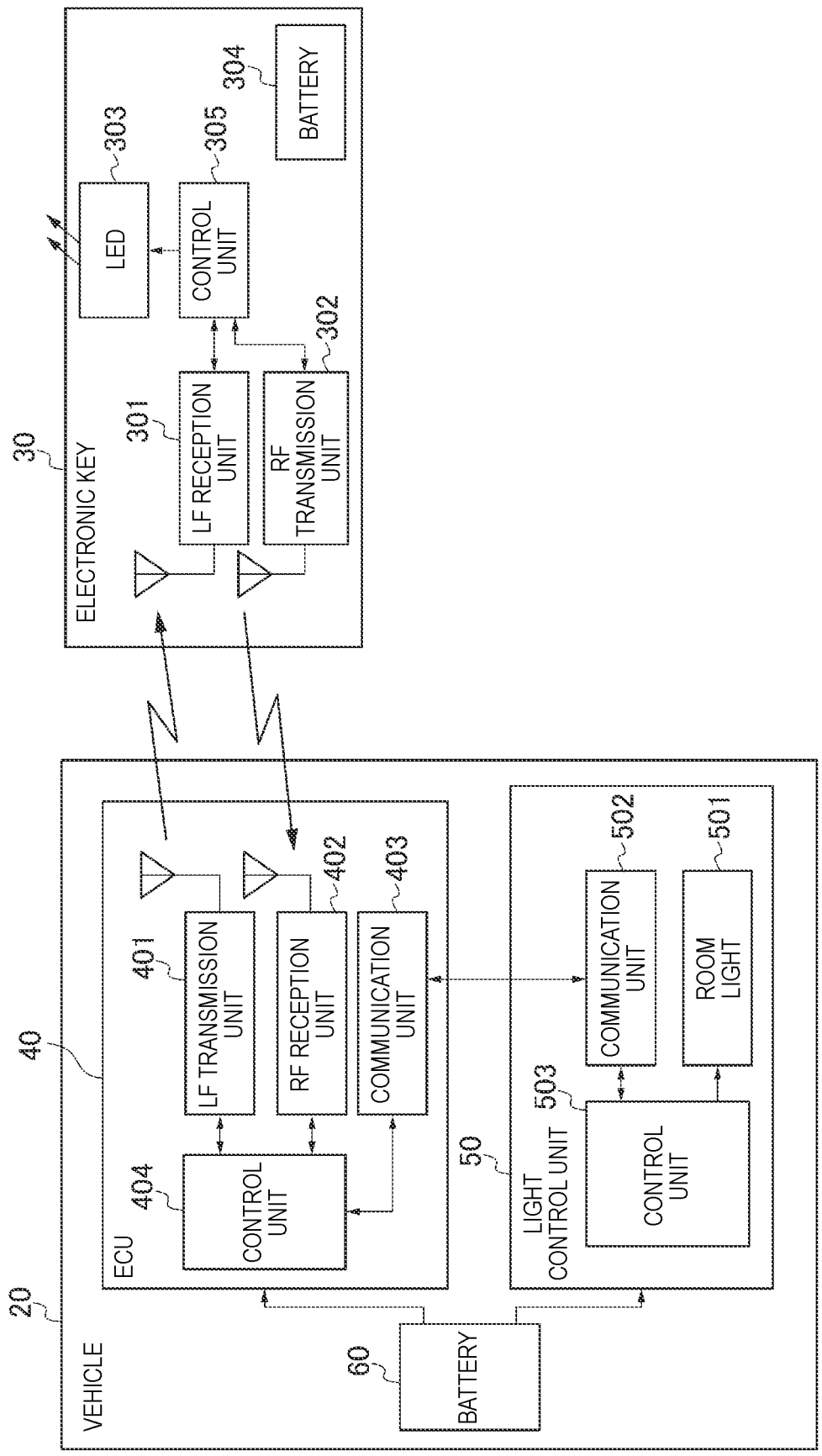
FIG. 1 is a block diagram illustrating a schematic configuration of a wireless communication system according to an embodiment.

Hereinafter, the wireless communication system according to the present embodiment will be described with reference to FIGS. 1 to 9. FIG. 1 is a block diagram illustrating a schematic configuration of a wireless communication system 10 according to the present embodiment. In this drawing, the wireless communication system 10 of the present embodiment includes a vehicle 20 and an electronic key (portable device) 30. The vehicle 20 includes an electronic control unit (ECU) (wireless communication device) 40, a light control unit 50, and a battery 60. The ECU 40 includes a low frequency (LF) transmission unit (first wireless communication circuit) 401 and a radio frequency (RF) reception unit (third wireless communication circuit) 402 that can wirelessly communicate with the electronic key 30, a communication unit 403 that communicates with the light control unit 50, and a control unit 404 that controls at least the LF transmission unit 401, the RF reception unit 402, and the communication unit 403.

The LF transmission unit 401 transmits data using, for example, a frequency of 125 kHz in a frequency band of 30 Hz to 300 kHz. The RF reception unit 402 receives data using a frequency of, for example, 433 MHz in a frequency band of 300 Hz to 3 THz. The communication unit 403 communicates with the light control unit 50 using a wire. The control unit 404 includes a central processing unit (CPU), a read only memory (ROM), a random access memory (RAM), an input signal circuit, an output signal circuit, or the like, which are not illustrated. The control unit 404 communicates with the electronic key 30 via the LF transmission unit 401 and the RF reception unit 402, and instructs the light control unit 50 of the illuminance of a room light (light emitting circuit) 501 to be described later based on a communication result. Details of the control of the control unit 404 will be described later.

Figure 2:
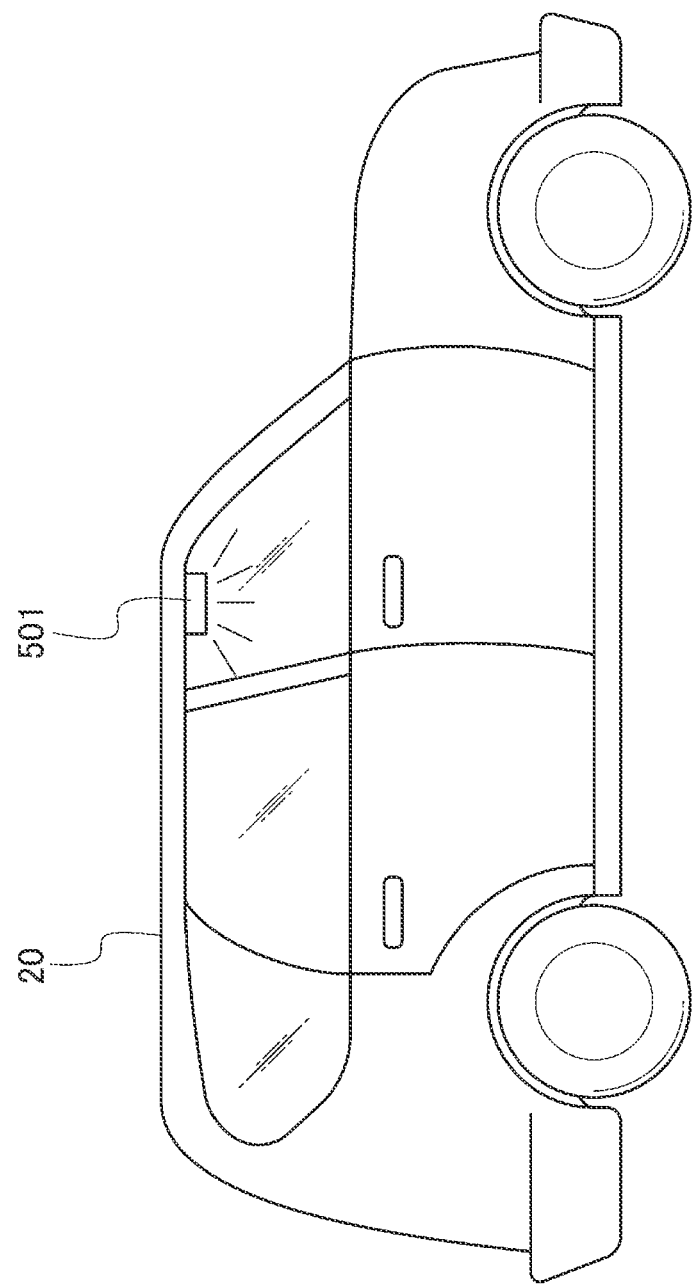
FIG. 2 is a diagram illustrating a vehicle and a room light of the wireless communication system according to the embodiment.

The light control unit 50 includes a room light 501 that is provided in the vehicle 20, a communication unit 502 that communicates with the communication unit 403 of the ECU 40, and a control unit 503 that controls the room light 501 and the communication unit 502. Similarly to the control unit 404 of the ECU 40 described above, the control unit 503 includes a CPU, a ROM, a RAM, an input signal circuit, an output signal circuit, or the like, which are not illustrated. The control unit 503 sets the illuminance of the room light 501 according to an instruction from the control unit 404 of the ECU 40. FIG. 2 is a diagram illustrating the vehicle 20 and the room light 501 of the wireless communication system 10 according to the present embodiment. As illustrated in this drawing, the room light 501 is disposed in a ceiling portion of an interior of the vehicle 20.

Returning to FIG. 1, the battery 60 supplies electric power for operating each of the ECU 40 and the light control unit 50. The battery 60 is used, for example, for starting an engine mounted on the vehicle 20, but may be dedicated to the ECU 40 and the light control unit 50.

The electronic key 30 includes an LF reception unit (second wireless communication circuit) 301 and an RF transmission unit (fourth wireless communication circuit) 302 capable of performing wireless communication with the vehicle 20, a light emitting diode (LED) 303, a battery 304, and a control unit 305 that controls the LF reception unit 301, the RF transmission unit 302, and the LED 303. LF reception unit 301 receives data using the frequency of 125 kHz that is the same as that of the LF transmission unit 401 of the vehicle 20 in the frequency band of 30 Hz to 300 kHz. The RF transmission unit 302 transmits data using the frequency of 433 MHz that is the same as that of the RF reception unit 402 of the vehicle 20 in a frequency band of 300 Hz to 3 THz.

Similarly to the control unit 404 of the ECU 40 described above, the control unit 305 includes a CPU, a ROM, a RAM, an input signal circuit, an output signal circuit, or the like, which are not illustrated. The control unit 305 communicates with the vehicle 20 (ECU 40) using the LF reception unit 301 and the RF transmission unit 302, and transmits an instruction to the vehicle 20 based on the communication result. Details of the control of the control unit 305 will be described later. The LED 303 indicates an operation state of the electronic key 30, and blinks, for example, when a voltage of the battery 304 decreases. The battery 304 supplies power to each unit of the electronic key 30.

Next, communication between the vehicle 20 and the electronic key 30 in the wireless communication system 10 of the present embodiment will be described. FIGS. 3A and 3B illustrate diagrams each illustrating a format of an LF command transmitted from the LF transmission unit 401 of the vehicle 20 of the wireless communication system 10 according to the present embodiment. FIG. 3A illustrates a format of an LF command Wa, and FIG. 3B illustrates a format of an LF command Wb. The LF command Wa includes a "wake pattern", a "command type (Wa)", an "LF antenna type", and a "group ID". The LF command Wb includes a "wake pattern", a "command type (Wb)", an "LF antenna type", a "group ID", and an "LF-Received Signal Strength Indicator (RSSI) burst".

The wake pattern is data for activating the electronic key 30. The command type is data indicating a communication type. Here, the electronic key 30 is notified of "with burst" or "without burst". The LF antenna type is data indicating from which antenna the LF is transmitted. The group ID is an ID for identifying a registered vehicle, and is different for vehicles. The LF-RSSI burst is data in which "1" of a carrier wave is continuous (used by the electronic key 30 to measure a signal strength). The time from the wake pattern to the group ID is, for example, 13.06 msec, and the time of the LF-RSSI burst is, for example, 2.9 msec.

FIGS. 4A and 4B illustrate diagrams each illustrating a format of an RF command transmitted from the RF transmission unit 302 of the electronic key 30 for the LF commands Wa, Wb transmitted from the vehicle 20 of the wireless communication system 10 according to the present embodiment. FIG. 4A illustrates the format of the RF command for the LF command Wa, and FIG. 4B illustrates the format of the RF command for the LF command Wb. The RF command for the LF command Wa includes a "synchronization pattern", a "function code", an "ID code", a "no-burst command", and "FOB information". The RF command for the LF command Wb includes a "synchronization pattern", a "function code", an "ID code", a "burst command", and "FOB information".

The synchronization pattern is data for determining whether it is an RF signal from the electronic key 30. The function code is data (for example, lock, unlock, or welcome write) indicating which function RF information corresponds to. The ID code is an ID unique to the electronic key (used to confirm that the electronic key is a registered electronic key). The FOB information is additional information of the registered electronic key (information for determining that the electronic key is the registered electronic key). The no-burst command is data for identifying that it is a response to a no-burst LF command. The burst command is data for identifying that it is a response to a burst LF command.

FIG. 5 is a diagram illustrating operations of the vehicle 20 and the electronic key 30 when the electronic key 30 approaches the vehicle 20 after a user leaves the vehicle 20 in the wireless communication system 10 according to the present embodiment. In this drawing, a space between the vehicle 20 and the electronic key 30 is divided into four regions A to D, and the form in which the electronic key 30 approaches the vehicle 20 is divided into five patterns P1 to P5. The four regions are the region A, the region B, the region C, and the region D in an order of being farthest from the vehicle 20.

A first threshold TH1 is set for a reception signal level between the region A and the region B (hereinafter, referred to as a "reception LF signal level"), and a second threshold TH2 is set for a reception LF signal level between the region C and the region D. That is, the first threshold TH1 is set for the reception LF signal level of the LF command Wa transmitted from the vehicle 20 by the electronic key 30, and the second threshold TH2 is set for the reception LF signal level of the LF command Wb transmitted from the vehicle 20 by the electronic key 30.

The pattern P1 is a pattern in which the electronic key 30 normally approaches the vehicle 20. The pattern P1 is performed as follows. An arrow Y1 in FIG. 5 indicates a moving direction of the electronic key 30, and the electronic key 30 is directed toward the vehicle 20.

A: Electronic Key 30 Present in Area A

The ECU 40 of the vehicle 20 transmits the LF command Wa for detecting the electronic key 30 registered in itself intermittently (for example, in a cycle of 300 msec).

The LF command Wa has a command format that suppresses transmission power (power consumption). Since the reception LF signal level is less than the first threshold TH1 (LF communication limit), the electronic key 30 does not perform communication.

B: When Electronic Key 30 Has Reached First Threshold TH1

Since the electronic key 30 can receive the LF command Wa, the electronic key 30 returns a response by the RF command. Upon receiving the RF response of the LF command Wa, the ECU 40 of the vehicle 20 switches the LF command Wa to the LF command Wb. The LF command Wb is transmitted intermittently (for example, in a period of 300 msec) by adding an LF-RSSI burst signal for detecting a distance between the vehicle 20 and the electronic key 30. The power (transmission power) for transmitting the LF command Wb is larger than the power for transmitting the LF command Wa.

C: When Electronic Key 30 Presents in Region C

The electronic key 30 receives the LF command Wb and measures a signal level (reception LF signal level) of the LF-RSSI burst signal. When the reception LF signal level is less than the second threshold TH2, the electronic key 30 does not respond to the LF command Wb. When there is no response from the electronic key 30 for a certain period of time after "B", the ECU 40 of the vehicle 20 returns to an intermittent transmission of the LF command Wa.

D: When Electronic Key 30 Has Reached Second Threshold TH2

The electronic key 30 responds to the LF command Wb. When the ECU 40 of the vehicle 20 receives the RF response of the LF command Wb, the ECU 40 turns on the room light 501 to end a welcome operation.

The pattern P2 is a pattern in which the electronic key 30 continues to remain in the region C.

A clockwise arrow in the region C indicates that the electronic key 30 continues to remain in the region C.

In the pattern P2, (1): when 30 seconds have elapsed (when the reception of the LF command Wb is performed xx times), the transmission of the RF command to the LF command Wb is not performed, and the state deviates from a welcome flow for turning on the room light 501 and transitions to a confirmation of leaving from the vehicle (2).

(2): since the electronic key 30 continues to remain even after an elapse of 5 minutes, the welcome flow is ended.

A pattern P3 is a pattern in which the electronic key 30 returns to the region A after the state of (1) of the pattern P2 is continued for, for example, 1 minute. However, in the pattern P3, a function of turning on the room light 501 is continued.

A pattern P4 is a pattern in which the electronic key 30 returns to the region A before entering the state of (1) of the pattern P2. However, in the pattern P4, a function of turning on the room light 501 is continued.

The pattern P5 is a pattern in which the electronic key 30 is continuously present in the region A. In the pattern P5, the function of turning on the room light 501 is ended.

Next, the operation of the wireless communication system 10 of the present embodiment will be described with reference to a flowchart.

Figure 6:
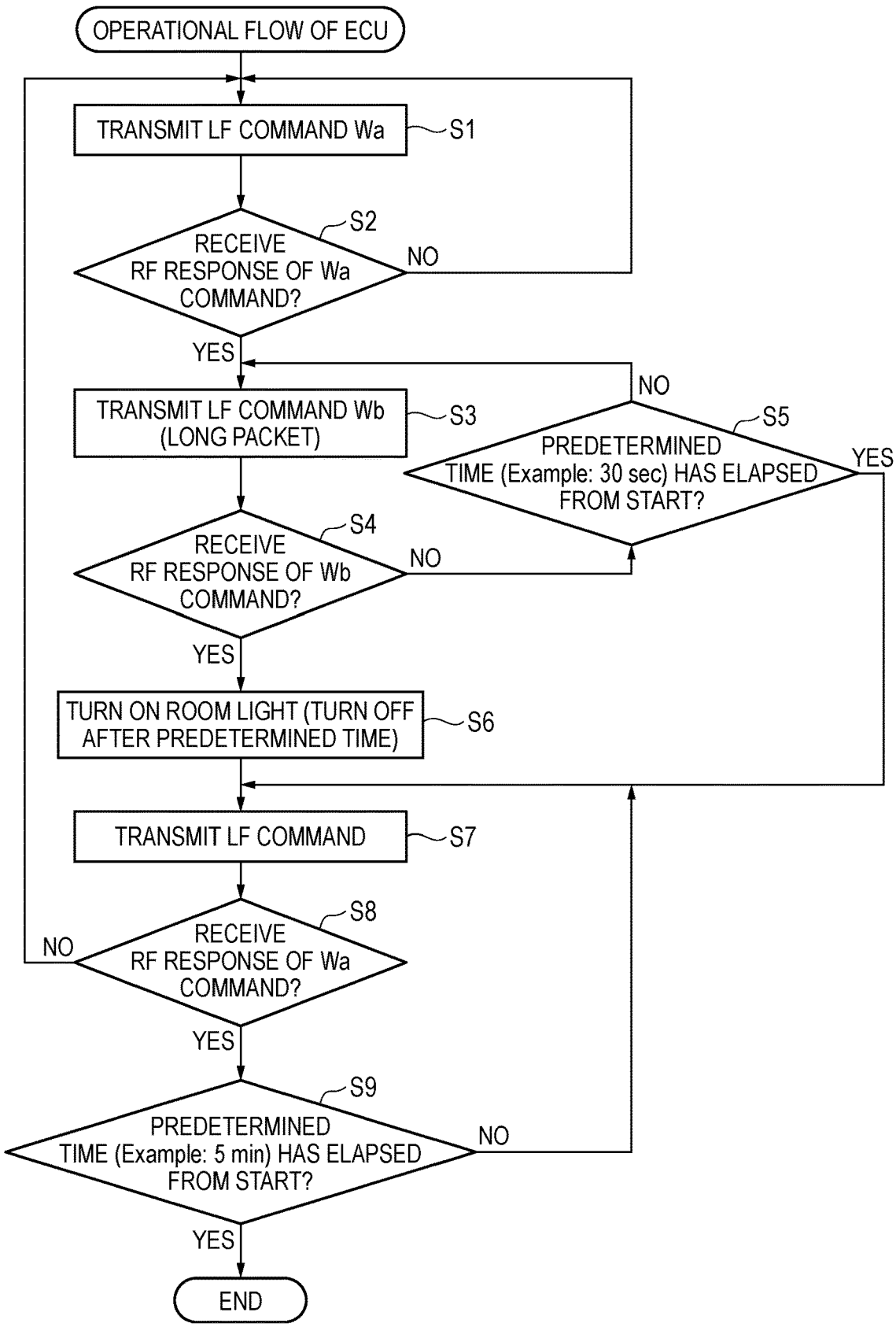
FIG. 6 is a flowchart illustrating an operation of an ECU of the wireless communication system according to the embodiment.

FIG. 6 is a flowchart illustrating an operation of the ECU 40 of the vehicle 20 of the wireless communication system 10 according to the present embodiment. In the description of the operation, the subject is ECU 40, but the vehicle 20 may be the subject. In this drawing, first, the ECU 40 transmits the LF command Wa (step S1). In this case, the LF command Wa is transmitted from the LF transmission unit 401 in a cycle of, for example, 300 msec.

Next, the ECU 40 determines whether the RF response of the LF command Wa, that is, the RF command (a first instruction) is received (step S2). When it is determined that the RF response has not been received ("NO" in step S2), the ECU 40 returns to step S1. On the other hand, when the ECU 40 determines that the RF response has been received ("YES" in step S2), the ECU 40 transmits the LF command Wb. That is, the LF command to which the LF-RSSI burst is added is transmitted to the LF command Wa (step S3).

Next, the ECU 40 determines whether the RF response (that is, the RF command for the LF command Wb) (a second instruction) of the LF command Wb has been received (step S4). When it is determined that the RF response is not received ("NO" in step S4), the ECU 40 determines whether a predetermined time (for example, 30 seconds) has elapsed from the start of transmission of the LF command Wb (step S5). When it is determined that the predetermined time has not elapsed from the start of transmission of the LF command Wb ("NO" in step S5), the processing returns to step S3. On the other hand, when it is determined that the predetermined time has elapsed from the start of transmission of the LF command Wb ("YES" in step S5), the processing proceeds to step S7 to be described later, and switching from the transmission of the LF command Wb to the transmission of the LF command Wa having a shorter packet length than the LF command Wb is performed. Accordingly, power saving can be achieved.

When it is determined in step S4 that the RF response of the LF command Wb has been received ("YES" in step S4), the ECU 40 turns on the room light 501 (a second illuminance) (step S6). The room light 501 is turned off (the first illuminance) after a predetermined time (for example, 30 seconds) has elapsed. Next, the ECU 40 transmits the LF command Wa (step S7). After the LF command Wa is transmitted, the ECU 40 determines whether the RF response of the LF command Wa is received (step S8), and when it is determined that the RF response of the LF command Wa is not received ("NO" in step S8), the processing returns to step S1, and when it is determined that the RF response of the LF command Wa is received ("YES" in step S8), it is determined whether a predetermined time (for example, 5 minutes) has elapsed from the start of transmission of the LF command Wa (step S9). When it is determined that the predetermined time has not elapsed from the start of transmission of the LF command Wa ("NO" in step S9), the processing returns to step S7, and when it is determined that the predetermined time has elapsed from the start of transmission of the LF command Wa ("YES" in step S9), the present processing is ended.

The processing of steps S7 to S9 described above is provided for the purpose that a user possessing the electronic key 30 may leave the vehicle 20 but not board in the vehicle 20 even when the room light 501 is turned on.

Further, when a path from the "YES" determination in step S5 to step S7 is taken, the room light 501 is not turned on even if the electronic key 30 approaches the vehicle 20. There are two reasons.

The first point is that this path is taken in a rare case where the electronic key 30 stays at a position of 2 to 3 m from the vehicle 20 but not approaches the vehicle 20. The second point is that the progress of the battery consumption of the vehicle 20 and the electronic key 30 is a problem larger than not turning on the light.

Figure 7:
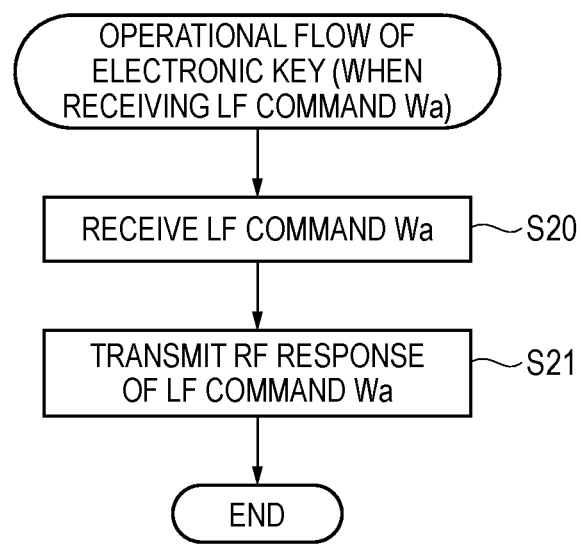
FIG. 7 is a flowchart illustrating an operation of the electronic key of the wireless communication system according to the embodiment when the electronic key receives the LF command Wa.

FIG. 7 is a flowchart illustrating an operation of the electronic key 30 of the wireless communication system 10 according to the present embodiment when the electronic key 30 receives the LF command Wa. In this drawing, first, the electronic key 30 receives the LF command Wa (step S20), then transmits an RF response of the LF command Wa (step S21), and ends this processing.

Figure 8:
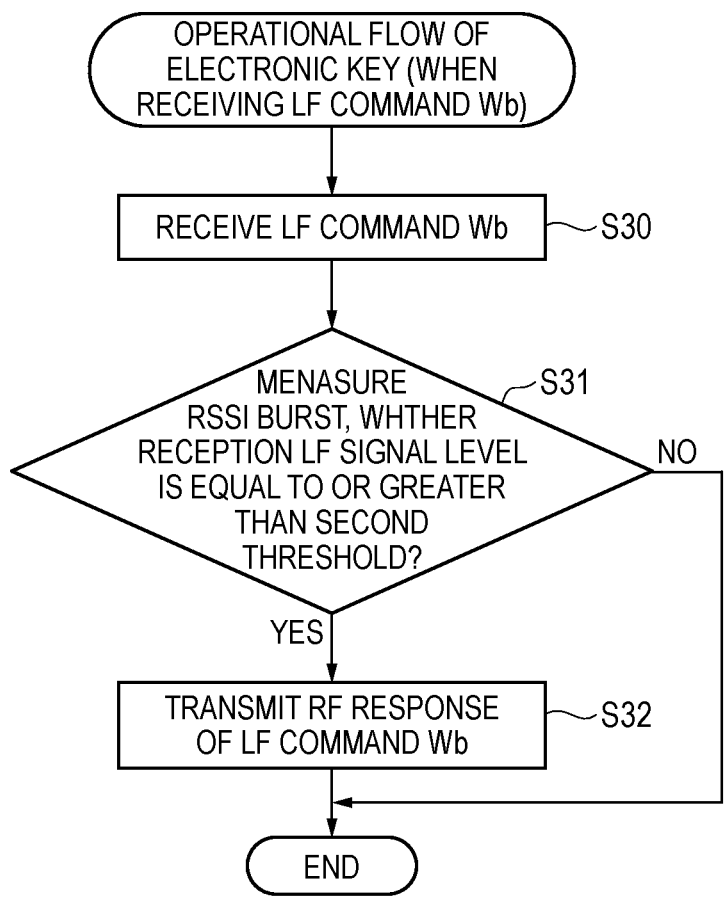
FIG. 8 is a flowchart illustrating an operation of the electronic key of the wireless communication system according to the embodiment when the electronic key receives the LF command Wb.

FIG. 8 is a flowchart illustrating an operation of the electronic key 30 of the wireless communication system 10 according to the present embodiment when the electronic key 30 receives the LF command Wb. In this drawing, first, the electronic key 30 receives the LF command Wb (step S30), then measures the RSSI burst from the LF-RSSI burst, which is a part of the LF command Wb, and determines whether the reception LF signal level (electric field strength) is equal to or greater than the second threshold TH2 (step S31). When it is determined that the reception LF signal level is equal to or greater than the second threshold TH2 ("YES" in step S31), the electronic key 30 transmits an RF response of the LF command Wb (step S32), and ends this processing. When "NO" is determined in step S31, the electronic key 30 ends the processing as it is.

As described above, the wireless communication system 10 of the present embodiment transmits, from the vehicle 20, the LF command Wa (first packet) having a short packet length that is for detection of the electronic key 30, and the LF command Wb (second packet) having a long packet length that is for detecting that the electronic key 30 has approached the vehicle 20 within a predetermined distance and turning on the room light 501. Since the LF command Wa (first packet) is transmitted until the vehicle 20 detects the electronic key 30 at the communication limit (first threshold TH1), power saving can be achieved during that time. Further, after the vehicle 20 transmits the LF command Wa (first packet) and detects the electronic key 30 at the communication limit, the vehicle 20 transmits the LF command Wb (second packet) with large power consumption in order to determine a distance to the electronic key 30, but by using the LF command Wb (second packet) with large power consumption, the electronic key 30 can be detected with high accuracy, and it is not necessary to frequently transmit the second packet, so that power saving can also be achieved in the transmission of the second packet.

Figure 9:
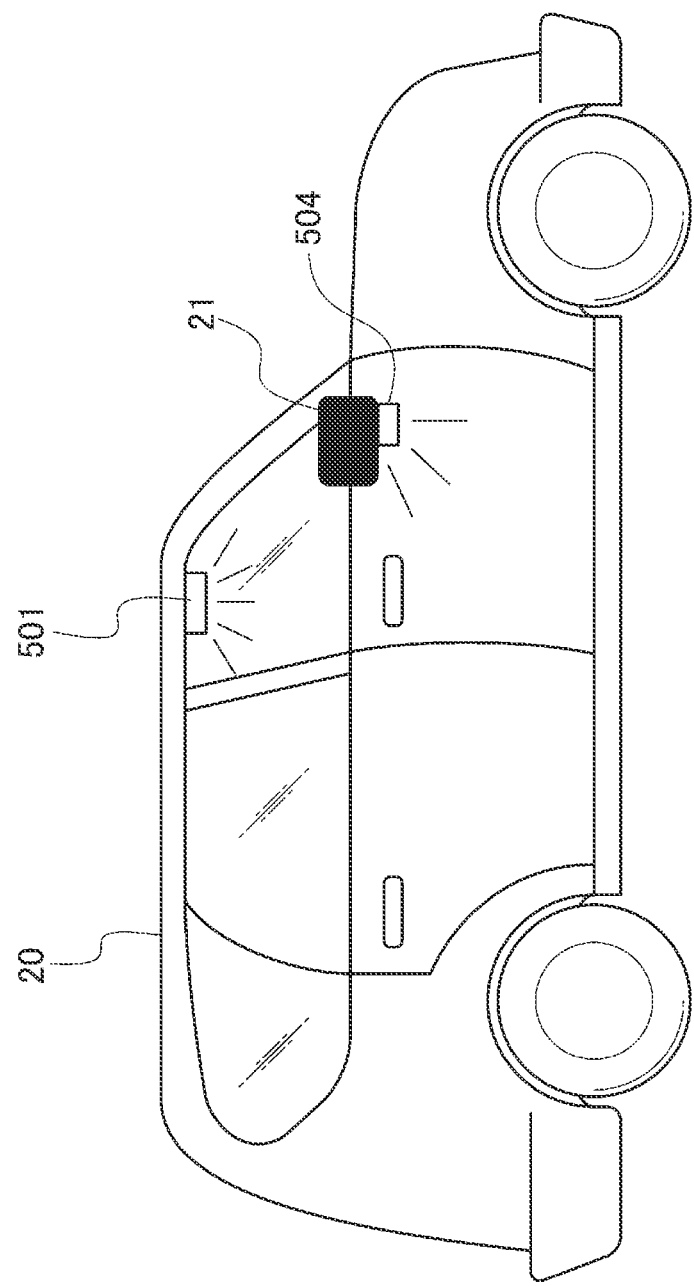
FIG. 9 is a diagram illustrating a vehicle in which a light is provided at a lower end portion of a door mirror to illuminate a vicinity of a door handle in an application example of the vehicle of the wireless communication system according to the embodiment.

In the wireless communication system 10 of the present embodiment, the room light 501 of the vehicle 20 is turned on, but in addition to this, a light may be provided at a lower end portion of a door mirror, and the light may be turned on to illuminate a vicinity of a door handle. FIG. 9 is a diagram illustrating an example thereof. As illustrated in this drawing, a light 504 is provided at a lower end portion of a door mirror 21 of the vehicle 20, and the light 504 is turned on to illuminate the vicinity of the door handle.

Although the present invention has been described in detail with reference to the specific embodiments it will be apparent to those skilled in the art that various changes and modifications can be made without departing from the spirit and scope of the present invention.

The present application is based on a Japanese Patent Application No. 2019-068798 filed Mar. 29, 2019, the contents of which are incorporated herein by reference.

INDUSTRIAL APPLICABILITY

The wireless communication system of the present disclosure is useful for vehicles such as automobiles.

REFERENCE SIGNS LIST 10 wireless communication system
20 vehicle
21 door mirror
30 electronic key
40 ECU
50 light control unit
60 battery
301 LF reception unit
302 RF transmission unit
303 LED
304 battery
305, 404, 503 control unit
401 LF transmission unit
402 RF reception unit
403, 502 communication unit
501 room light
504 light
TH1 first threshold
TH2 second threshold

The invention claimed is:

1. A wireless communication system comprising:
a vehicle; and
a portable device,
wherein the vehicle includes a light emitting circuit capable of changing illuminance and a first wireless communication circuit capable of performing wireless communication with the portable device,
wherein the portable device includes a second wireless communication circuit capable of performing wireless communication with the first wireless communication circuit of the vehicle,
wherein at least in a case where the light emitting circuit of the vehicle has a first illuminance, the first wireless communication circuit of the vehicle transmits a first packet,
wherein in a case where the second wireless communication circuit receives the first packet, the portable device transmits a first instruction to the vehicle,
wherein in a case where the vehicle receives the first instruction, the first wireless communication circuit of the vehicle transmits a second packet having a packet length longer than that of the first packet,
wherein in a case where the second wireless communication circuit receives the second packet, the portable device transmits a second instruction to the vehicle based on an electric field intensity of at least a part of the second packet, and
wherein in a case where the vehicle receives the second instruction, the light emitting circuit of the vehicle has a second illuminance that is brighter than the first illuminance.

2. The wireless communication system according to claim 1,
wherein in the case where the second wireless communication circuit receives the second packet, the portable device transmits the second instruction to the vehicle when an electric field intensity of the at least a part of the second packet is equal to or greater than a predetermined value.

3. The wireless communication system according to claim 2,
wherein in the case where the second wireless communication circuit receives the second packet, the portable device does not transmit the second instruction to the vehicle when the electric field intensity of the at least a part of the second packet is less than the predetermined value.

4. The wireless communication system according to claim 1,
wherein in the case where the vehicle receives the first instruction, the first wireless communication circuit of the vehicle repeatedly transmits the second packet at predetermined time intervals.

5. The wireless communication system according to claim 4,
wherein the first wireless communication circuit of the vehicle stops the repetitive transmission of the second packet in a case where the second packet is repeatedly transmitted for a time longer than a predetermined time.

6. The wireless communication system according to claim 5,
wherein the first wireless communication circuit of the vehicle stops the repetitive transmission of the second packet and transmits the first packet in the case where the second packet is repeatedly transmitted for the time longer than the predetermined time.

7. The wireless communication system according to claim 1,
wherein the vehicle further includes a third wireless communication circuit, wherein the portable device further includes a fourth wireless communication circuit, wherein the first instruction is transmitted from the fourth wireless communication circuit of the portable device to the third wireless communication circuit of the vehicle, and wherein the second instruction is transmitted from the fourth wireless communication circuit of the portable device to the third wireless communication circuit of the vehicle.

8. The wireless communication system according to claim 7, wherein a wavelength of a radio wave used in communication between the first wireless communication circuit and the second wireless communication circuit is longer than a wavelength of a radio wave used in communication between the third wireless communication circuit and the fourth wireless communication circuit.

9. The wireless communication system according to claim 1, wherein the first illuminance of the light emitting circuit indicates turning off.

10. The wireless communication system according to claim 1, wherein at least a part of the second packet continues for a predetermined time and keeps at predetermined amplitude.

11. A wireless communication system comprising:

a wireless communication device capable of being mounted on a vehicle; and a portable device, wherein the vehicle includes a light emitting circuit capable of changing illuminance, wherein the wireless communication device includes a first wireless communication circuit capable of performing wireless communication with the portable device, wherein the portable device includes a second wireless communication circuit capable of performing wireless communication with the first wireless communication circuit of the wireless communication device, wherein at least in a case where the light emitting circuit of the vehicle has a first illuminance, the first wireless communication circuit of the wireless communication device transmits a first packet, wherein in a case where the second wireless communication circuit receives the first packet, the portable device transmits a first instruction to the wireless communication device, wherein in a case where the wireless communication device receives the first instruction, the first wireless communication circuit of the wireless communication device transmits a second packet having a packet length longer than that of the first packet, wherein in a case where the second wireless communication circuit receives the second packet, the portable device transmits a second instruction to the wireless communication device based on an electric field strength of at least a part of the second packet, and wherein in a case where the wireless communication device receives the second instruction, the light emitting circuit of the vehicle has a second illuminance that is brighter than the first illuminance.

12. The wireless communication system according to claim 11, wherein in the case where the second wireless communication circuit receives the second packet, the portable device transmits the second instruction to the wireless communication device when the electric field intensity of the at least a part of the second packet is equal to or greater than a predetermined value.

13. The wireless communication system according to claim 12, wherein in the case where the second wireless communication circuit receives the second packet, the portable device does not transmit the second instruction to the wireless communication device when the electric field intensity of the at least a part of the second packet is less than the predetermined value.

14. The wireless communication system according to claim 11, wherein in the case where the first instruction is received, the first wireless communication circuit of the wireless communication device repeatedly transmits the second packet at predetermined time intervals.

15. The wireless communication system according to claim 14, wherein the first wireless communication circuit of the wireless communication device stops the repetitive transmission of the second packet in a case where the second packet is repeatedly transmitted for a time longer than a predetermined time.

16. The wireless communication system according to claim 15, wherein the first wireless communication circuit of the wireless communication device stops the repetitive transmission of the second packet and transmits the first packet when the second packet is repeatedly transmitted for the time longer than the predetermined time.

17. The wireless communication system according to claim 11, wherein the wireless communication device further includes a third wireless communication circuit, wherein the portable device further includes a fourth wireless communication circuit, wherein the first instruction is transmitted from the fourth wireless communication circuit of the portable device to the third wireless communication circuit of the wireless communication device, and wherein the second instruction is transmitted from the fourth wireless communication circuit of the portable device to the third wireless communication circuit of the wireless communication device.

18. The wireless communication system according to claim 17, wherein a wavelength of a radio wave used in communication between the first wireless communication circuit and the second wireless communication circuit is longer than a wavelength of a radio wave used in communication between the third wireless communication circuit and the fourth wireless communication circuit.

19. The wireless communication system according to claim 11, wherein the first illuminance of the light emitting circuit indicates turning off.

20. The wireless communication system according to claim 11, wherein at least a part of the second packet continues for a predetermined time and keeps at predetermined amplitude.

* * * * *